(12) United States Patent
Haraguchi (10) Patent No.: US 11,184,554 B2
(45) Date of Patent: Nov. 23, 2021

(54) APPARATUS FOR TRANSMITTING A CONTROL SIGNAL FOR DRIVING A DRIVING MODE

(71) Applicant: CANON KABUSHIKI KAISHA, Tokyo (JP)

(72) Inventor: Kazuki Haraguchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/676,265

(22) Filed: Nov. 6, 2019

(65) Prior Publication Data

US 2020/0154031 A1    May 14, 2020

(30) Foreign Application Priority Data

Nov. 14, 2018 (JP) .............................. JP2018-213730

(51) Int. Cl.

| H04N 5/235 | (2006.01) |
|---|---|
| H04N 5/353 | (2011.01) |
| H04N 5/345 | (2011.01) |
| H04N 5/225 | (2006.01) |
| H04N 5/232 | (2006.01) |

(52) U.S. Cl.
CPC ......... *H04N 5/2357* (2013.01); *H04N 5/2351* (2013.01); *H04N 5/2353* (2013.01); *H04N 5/3535* (2013.01)

(58) Field of Classification Search
CPC .. H04N 5/2357; H04N 5/3535; H04N 5/2353; H04N 5/2351; H04N 5/3456; H04N 5/3532; H04N 5/2253; H04N 5/2327

USPC ........................................... 348/226.1, 228.1
See application file for complete search history.

(56) References Cited

U.S. PATENT DOCUMENTS

| 9,288,404 | B2* | 3/2016 | Papiashvili | .......... H04N 5/2357 |
| 9,307,163 | B2* | 4/2016 | Aota | ..................... H04N 5/2357 |
| 2001/0040628 | A1* | 11/2001 | Akahori | ................. H04N 5/772 |
| | | | | 348/229.1 |
| 2006/0221205 | A1* | 10/2006 | Nakajima | ............ H04N 5/2357 |
| | | | | 348/226.1 |
| 2012/0314100 | A1* | 12/2012 | Frank | ................. H04N 5/35554 |
| | | | | 348/229.1 |

(Continued)

FOREIGN PATENT DOCUMENTS

| CN | 104364673 A | 2/2015 |
| JP | 2017-11352 A | 1/2017 |

*Primary Examiner* — Albert H Cutler
(74) *Attorney, Agent, or Firm* — Canon U.S.A., Inc. IP Division (57) ABSTRACT

An apparatus includes a sensor including a pixel unit in which a plurality of unit pixels each including a photoelectric conversion element is arranged in a column direction and a row direction, and a control unit configured to transmit a control signal containing a period signal for controlling driving of the sensor, wherein the control unit transmits, to the sensor, the control signal for driving a first driving mode, in which a pixel row in the pixel unit is read at a predetermined interval, and a second driving mode, in which a pixel row that is not read in the first driving mode is read at a predetermined interval, and wherein the control unit performs control in such a manner that the second driving mode is driven a plurality of times during one period for transmitting the period signal for driving the first driving mode.

6 Claims, 9 Drawing Sheets

(56) References Cited

U.S. PATENT DOCUMENTS

2014/0092277 A1* 4/2014 Kannermark .......... H04N 5/376
                                                    348/226.1
2019/0289231 A1* 9/2019 Hada .................... G06T 3/0018

* cited by examiner

FIG. 8A
CASE OF PERFORMING FLICKER DETECTION MODE DURING VERTICAL BLANKING TIME PERIOD IN LIVE VIEW MODE

FIG. 8B
CASE OF PERFORMING FLICKER DETECTION MODE SEPARATELY

APPARATUS FOR TRANSMITTING A CONTROL SIGNAL FOR DRIVING A DRIVING MODE

BACKGROUND OF THE INVENTION

Field of the Invention

The present invention relates to an apparatus.

Description of the Related Art

In recent years, an image capturing apparatus such as a digital camera has become capable of capturing an image without a blur in a short charge accumulation time period even under a relatively dark environment such as an indoor environment. In a case where a subject is illuminated with light from a light source such as a fluorescent light source, exposures of frames of captured images can fluctuate and/or an uneven exposure (hereinafter, also referred to as flicker) can occur within a frame due to an effect of a frequency of a power source that drives the light source.

There is discussed a technique for detecting whether a light source (hereinafter, also referred to as a flicker light source) that can cause a flicker such as a fluorescent light source is used for a subject based on luminance information of a plurality of acquired images. For example, Japanese Patent Application Laid-Open No. 2017-11352 discusses an algorithm for controlling an image capturing apparatus using a mode (hereinafter, also referred to as a flicker detection mode) of capturing images at a high-speed frame rate of 600 fps or higher and detecting a flicker from the plurality of acquired images.

SUMMARY OF THE INVENTION

According to an aspect of the present invention, an apparatus includes a sensor including a pixel unit in which a plurality of unit pixels each including a photoelectric conversion element is arranged in a column direction and a row direction, and a control unit configured to transmit a control signal containing a period signal for controlling driving of the sensor, wherein the control unit transmits, to the sensor, the control signal for driving a first driving mode, in which a pixel row in the pixel unit is read at a predetermined interval, and a second driving mode, in which a pixel row that is not read in the first driving mode is read at a predetermined interval, and wherein the control unit performs control such that the second driving mode is driven a plurality of times during one period for transmitting the period signal for driving the first driving mode.

Further features of the present invention will become apparent from the following description of exemplary embodiments with reference to the attached drawings.

DESCRIPTION OF THE EMBODIMENTS

Figure 1:
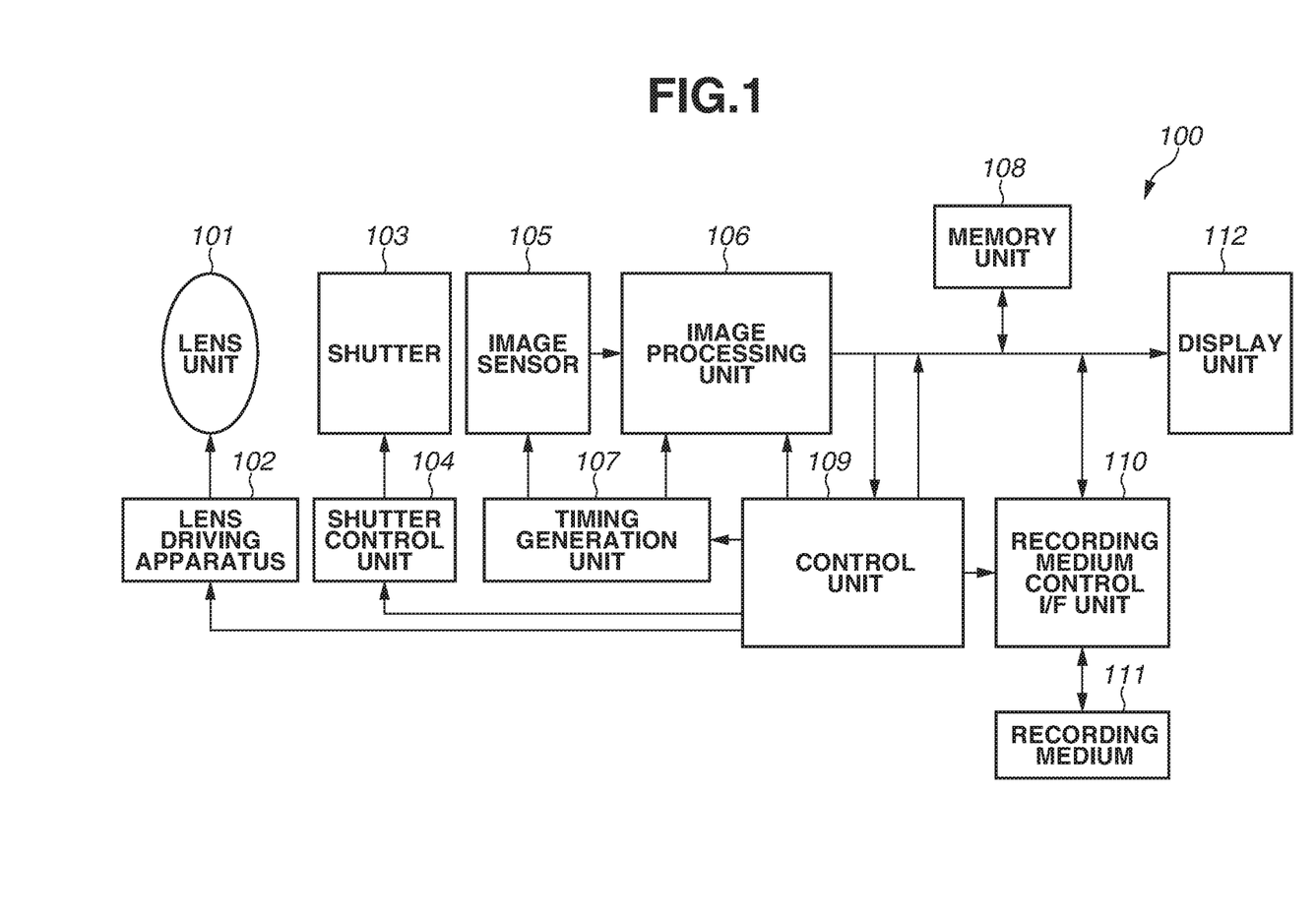
FIG. 1 is a block diagram illustrating an image capturing apparatus according to an exemplary embodiment of the present invention.

Various exemplary embodiments of the present invention will be described in detail below with reference to the attached drawings. FIG. 1 is a block diagram illustrating an example of a configuration of an image capturing apparatus according to an exemplary embodiment of the present invention. An image capturing apparatus 100 according to the present exemplary embodiment is, for example, a digital camera and includes a still image capturing function and a moving image capturing function. In the still image capturing function, still image data in Joint Photographic Experts Group (JPEG) format can be generated, and uncompressed still image data in raw format can be acquired. In the moving image capturing function, moving image data in 4K or 8K format can be acquired at a frame rate of 30 frames per second (fps) or higher.

In FIG. 1, a lens unit 101 forms an optical image of a subject on an image sensor 105, and a lens driving apparatus 102 performs zoom control, focus control, and aperture control. A shutter control unit 104 mechanically controls a mechanical shutter 103 to control a light-shielding state with respect to the image sensor 105. The image sensor 105 converts the subject image formed by the lens unit 101 into an image signal using a photoelectric conversion effect and acquires the image signal. The image sensor 105 according to the present exemplary embodiment is a complementary metal oxide semiconductor (CMOS) image sensor including a plurality of pixels in horizontal and vertical directions. The number of pixels included in the image sensor 105 is sufficient for acquiring a moving image in the 8K format. For example, the image sensor 105 includes 32000000 or more pixels. Each pixel can include a microlens for increasing a light collection efficiency and a plurality of photoelectric conversion units.

An image processing unit 106 performs various types of correction on the image signal output from the image sensor 105. The image processing unit 106 according to the present exemplary embodiment performs defect correction, streak correction, and color correction on the image signal in addition to various types of image processing such as image combining processing, development processing, and compressing/encoding processing. The image processing unit 106 detects various types of information from an image signal corresponding to a single frame or a plurality of frames acquired from the image sensor 105. Examples of various types of information to be detected from an image include luminance information that specifies brightness of the image, subject information about a subject contained in the image, and range information that specifies a distance to the subject. The image processing unit 106 according to the present exemplary embodiment is capable of detecting information about a light source in the image based on the luminance information contained in the plurality of image signals.

A timing generation unit 107 is a driving unit configured to output various timing signals to the image sensor 105 and the image processing unit 106. Based on a clock from a predetermined clock source, the timing generation unit 107 generates a synchronization signal to be transmitted to the image sensor 105 and sets various operation parameters including a driving mode setting to the image sensor 105 or the image processing unit 106 based on control by a control unit 109.

The control unit 109 controls various calculations and the entire image capturing apparatus 100 and includes a central processing unit (CPU). The control unit 109 sets various setting parameters to each component. For example, the control unit 109 sets various parameters for driving to the image sensor 105 either via the timing generation unit 107 or directly and supplies a timing signal including a period signal for controlling an output timing.

The control unit 109 executes a program recorded in a memory unit 108 to implement each process described below in the present exemplary embodiment. The control unit 109 includes a system memory, and, for example, a random access memory (RAM) is used as the system memory. To the system memory, a constant and a variable for operating the control unit 109 and a program read from a non-volatile memory are loaded. The non-volatile memory is an electrically erasable and recordable memory, and, for example, a flash memory is used as the non-volatile memory. The non-volatile memory can be configured to store the constant for operating the control unit 109 and the program. The term "program" as used herein refers to a program for executing various types of control described below in the present exemplary embodiment. The control unit 109 can also include a hardware circuit including a reconfigurable circuit besides the CPU for executing the program.

The memory unit 108 temporarily stores image data. A recording medium control I/F unit 110 is an interface for recording to or reading from a recording medium 111. The recording medium 111 is a removable recording medium such as a semiconductor memory for recording or reading image data. A display unit 112 displays various types of information and a captured image together with a predetermined user interface. A touch panel may be provided on the display unit 112 as an operation unit (not illustrated) for receiving various operation instructions from a user with respect to the image capturing apparatus 100.

Next, an image capturing operation of the image capturing apparatus 100 having the above-described configuration will be described below.

If a user operates a power switch of the operation unit (not illustrated), a main power source is turned on or a standby state is cancelled. Consequently, power is supplied to the control unit 109 and also to circuits that are necessary for image capturing such as the image processing unit 106 and the image sensor 105.

Thereafter, the image sensor 105 starts operating in a live-view mode in synchronization with a predetermined synchronization signal based on control by the control unit 109. Image data read in the live-view mode is displayed on the display unit 112 in synchronization with a synchronization signal for display. During the operation in the live-view mode, if a release switch of the operation unit (not illustrated) is operated, the control unit 109 controls the timing generation unit 107 and switches the image sensor 105 to an operation in a still image mode. If the image capturing operation in the still image mode is started, the image sensor 105 outputs a signal (all pixel rows in an effective region) from a corresponding pixel as image data. The image data output from the image sensor 105 undergoes correction calculation and image processing performed in the image processing unit 106 and is written to the memory unit 108 based on an instruction from the control unit 109. Data accumulated in the memory unit 108 is recorded to the removable recording medium 111 such as a semiconductor memory via the recording medium control I/F unit 110 based on control by the control unit 109.

The image data can be output to a computer either directly or indirectly via an external I/F unit (not illustrated).

(Operation of Image Sensor)

Figure 2:
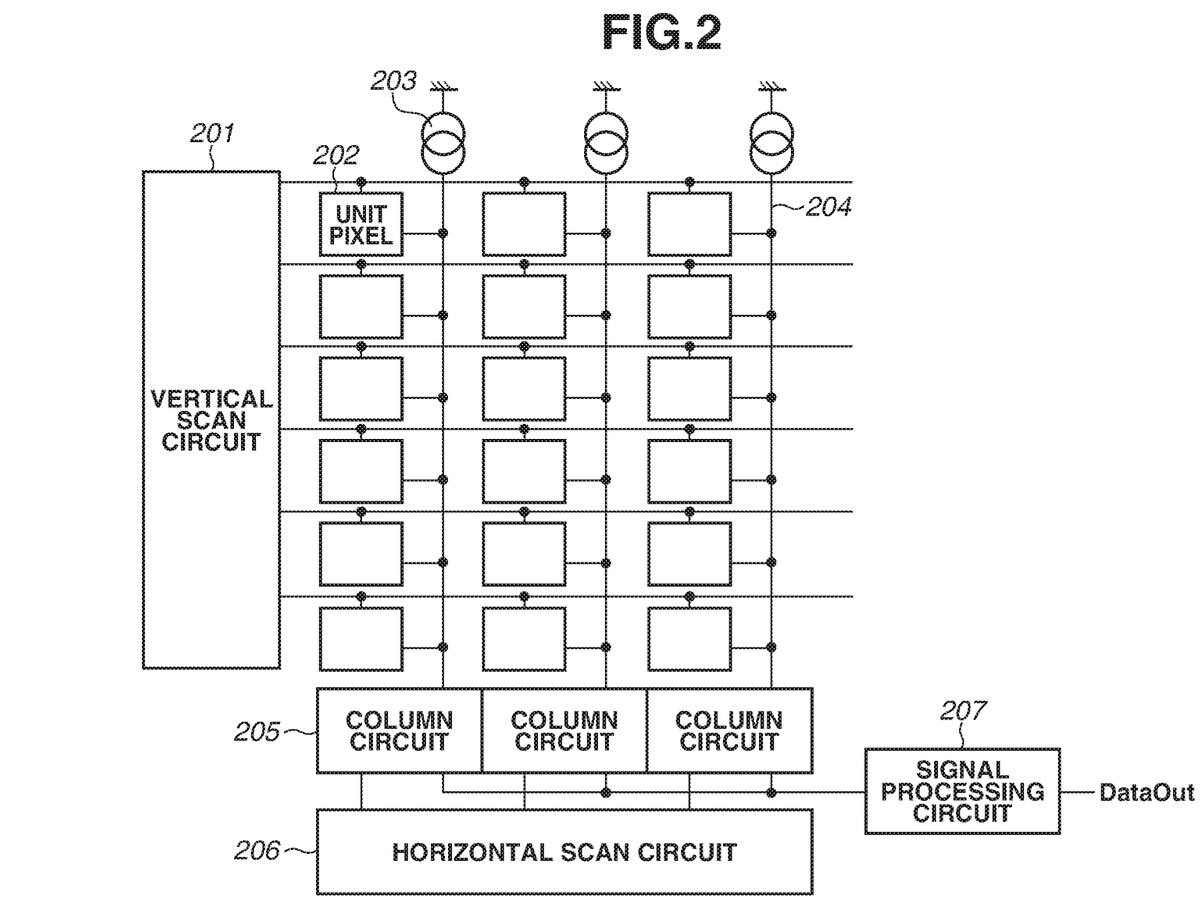
FIG. 2 is a circuit diagram illustrating a configuration of an image sensor according to an exemplary embodiment of the present invention.

A configuration of the image sensor 105 according to a first exemplary embodiment will be described below with reference to FIG. 2. FIG. 2 illustrates a circuit configuration of the image sensor 105. The image sensor 105 includes a pixel unit in which a plurality of unit pixels 202 is arranged in matrix, i.e., in a column direction and a row direction. The unit pixels 202 each include a photoelectric conversion element and a plurality of transistor elements configured to drive the photoelectric conversion element. The photoelectric conversion element converts incident light into an electric signal using a photoelectric effect. The transistor elements of each of the unit pixels 202 are controlled by a pixel control signal input from a vertical scan circuit 201. In particular, each row (pixel row) shares a horizontal signal line for supplying the control signal from the vertical scan circuit 201 to each of the unit pixels 202, and the vertical scan circuit 201 controls the unit pixels 202 mainly row by row by sequentially controlling the row units each including the plurality of unit pixels 202. For example, initialization of the photoelectric conversion element and reading of an electric signal from the unit pixel 202 are controlled by the row unit that shares the horizontal signal line. While each row is configured to share the horizontal signal line in the present exemplary embodiment for the purpose of simplifying the description, the configuration is not limited thereto. For example, two or more horizontal signal lines may be provided to each row and alternately connected to the unit pixels 202, or a plurality of rows may be configured to share a horizontal signal line. Further, the unit pixels 202 each include a red, green, or blue color filter and form a Bayer arrangement.

The electric signals output from the unit pixels 202 are input to a column circuit 205 via a vertical signal line 204, which is formed column by column (pixel column) and includes the plurality of unit pixels 202. The vertical signal line 204 is driven by a constant current source 203. The column circuit 205 includes an amplifier circuit configured to amplify a signal, an analog/digital (AD) conversion circuit configured to convert an output from the unit pixels 202 into a digital signal, a memory configured to store an AD conversion result, and an addition/subtraction processing circuit configured to perform addition/subtraction on the AD conversion result or a signal on which the AD conversion is to be performed. The digital signal processed by the column circuit 205 is sequentially output, column by column, as image data to a signal processing circuit 207 by a horizontal scan circuit 206.

While the configuration in which one vertical signal line and one column circuit are provided to each pixel column is described as an example herein, a plurality of vertical signal lines 204 and a plurality of column circuits 205 may be provided to each pixel column, and a plurality of rows may be read simultaneously. For example, in a case of providing 12 or more vertical signal lines 204 to each column, image data of 12 rows is read by one reading operation. In the case of the configuration including the plurality of vertical signal lines 204 as described above, a backside illumination or multi-layer configuration that permits a circuit to be mounted on an opposite surface to a light incident surface is desirable. The signal processing circuit 207 includes a clamp processing unit configured to remove a component that is offset by a dark current generated in the unit pixels 202. An interface for outputting image data to the image processing unit 106, which is a subsequent unit, is desirably an interface that employs a high-speed communication method using a differential pair such as a low-voltage differential signaling (LVDS) method or scalable low-voltage signaling (SLVS) method. In a case of a configuration including a plurality of lanes as an interface for outputting image data, each of the lanes can be configured to output a different signal from one another.

Figure 3:
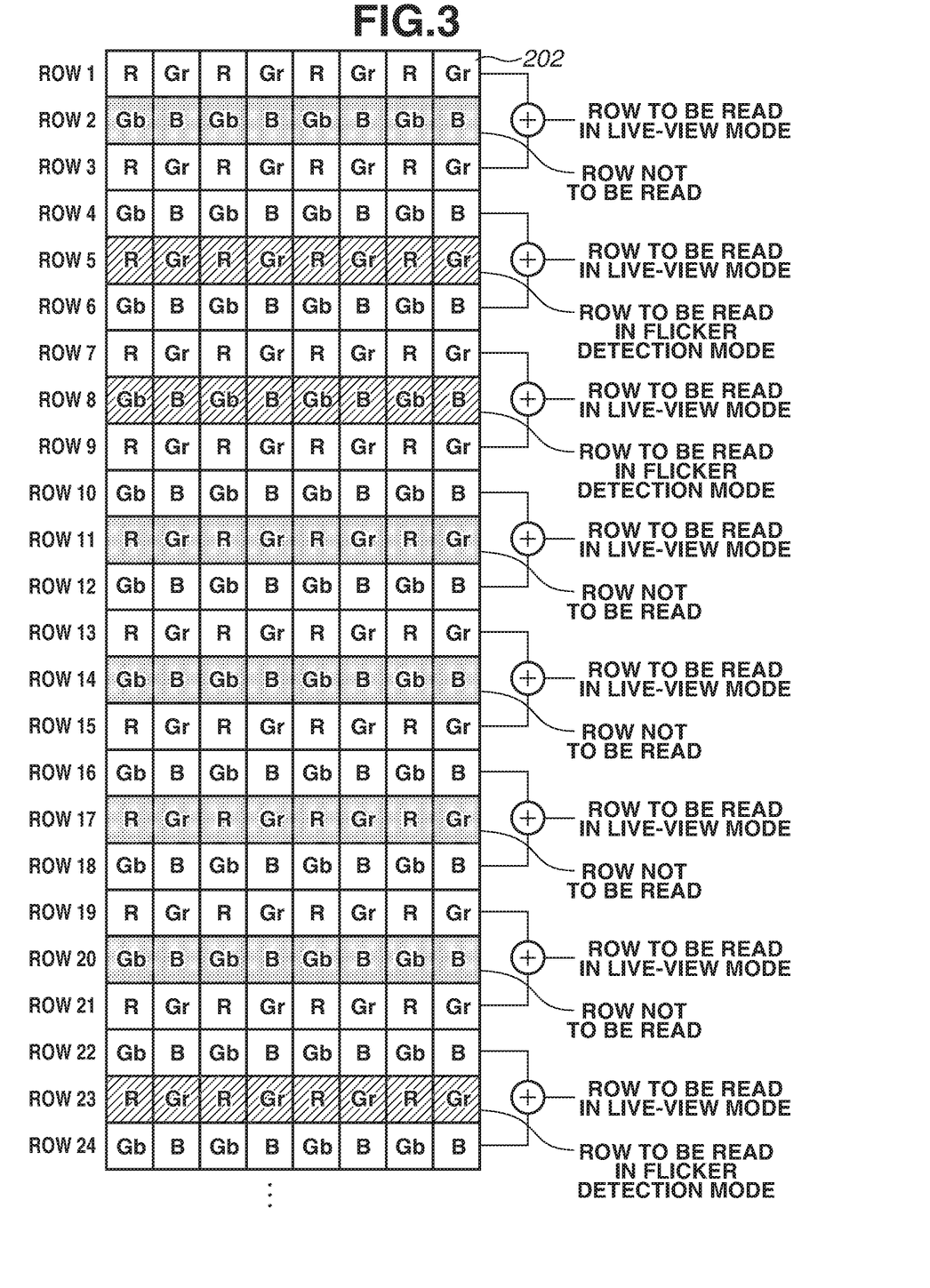
FIG. 3 is a diagram illustrating rows of the image sensor that are to be read in a live-view mode and a flicker detection mode according to an exemplary embodiment of the present invention.

Next, operations in the live-view mode and a flicker detection mode will be described below with reference to FIG. 3. FIG. 3 illustrates a part of the arrangement of the unit pixels 202 in the image sensor 105, and each index indicates a color (R: red, Gr/Gb: green, B: blue) of the color filter provided to each of the unit pixels 202. FIG. 3 illustrates the arrangement of the unit pixels 202 and indicates the rows from which a signal is to be read during the operation in the live-view mode and the rows from which a signal is to be read during the operation in the flicker detection mode.

First, the pixel rows to be read during the operation in the live-view mode will be described below. A live-view operation refers to an operation of displaying an image on a rear liquid crystal display or an electronic viewfinder of the display unit 112 to provide the image for use by a user in determining an angle of view and an image capturing condition such as an exposure condition. In other words, such image data is not to be stored in the recording medium 111, and since the number of pixels of the rear liquid crystal display is less than the number of unit pixels 202 of the image sensor 105, it is not necessary to read image data from all the unit pixels 202. In general, the number of pixels to be read is reduced to a number equal to or close to the number of pixels or rows of the rear liquid crystal display. For example, in a case where the number of effective pixels of the image sensor 105 is 8000 pixels in a horizontal direction and 5400 pixels in a vertical direction, reading image data of at least one third of the number of pixels in the vertical direction is enough to obtain a resolution corresponding to a full high definition sufficient for displaying an image on the display unit 112. In the present exemplary embodiment, an example of omitting every third row of the rows to be read (three-row period) will be described. More specifically, in FIG. 3, an example will be described in which the number of pixels is reduced by omitting every third red row, which includes the unit pixels 202 including a color filter R, and every third blue row, which includes the unit pixels 202 including a color filter B, in the row direction. Further, an example of adding two rows and not reading one row (omitting one row) in the three-row period will be described. The reading methods of the three-row period and adding and averaging the two rows of the three-row period are mere examples. Another period can also be used, e.g., a period of adding and averaging three rows of a five-row period. Further, the addition method may be an operation of simply adding or an operation of adding and averaging. The method of adding signals of two rows is intended to be, but not limited to, an adding and averaging method in which different rows are simultaneously connected to the vertical signal line 204.

Next, the pixel rows to be read in the operation in the flicker detection mode will be described below. In the operation in the flicker detection mode, it is desirable to set the rows to be read so as to achieve a frame rate of 600 fps (≈1.66 millisecond (msec)) or higher. Thus, in the present exemplary embodiment, the image sensor 105 takes about 15 msec to read the pixel rows of one frame and is configured to read every ninth red row and every ninth blue row (nine-row period) in the row direction (i.e., 15 msec/nine-row period=1.66 msec).

The pixel rows to be read in the operation in the flicker detection mode are the pixel rows that are not to be read in the operation in the live-view mode as illustrated in FIG. 3. Since the pixel rows that are not to be read in the operation in the live-view mode are used as described above, the live-view mode and the flicker detection mode can be set at the same time. More specifically, this makes it possible to independently control charge accumulation and resetting operations in each of the modes. In the present exemplary embodiment, the electric signals output respectively from the target pixel rows in the operation in the live-view mode and from the target pixel rows in the operation in the flicker detection mode are processed using the common column circuit 205. Thus, timings of readout to the column circuit 205 are exclusively controlled.

While the number of target pixel rows in the operation in the live-view mode and that in the flicker detection mode are illustrated in FIG. 3, the number of pixels to be read may be set differently in the horizontal direction (pixel column) In one example, all the pixels are read without omitting or adding in the horizontal direction in the operation in the live-view mode, whereas every third column is read in the operation in the flicker detection mode. This configuration increases a reading rate in the operation in the flicker detection mode. In a case of putting priority on a processing load of the image processing unit 106, the number of target pixel columns in the operation in the live-view mode and that in the flicker detection mode may be set to the same number. Since the image processing unit 106 sequentially performs processing pixel-row by pixel-row, if the numbers of pixels are the same in both of the modes, the same processing parameters can be used, whereby the processing load can be reduced.

Figure 4:
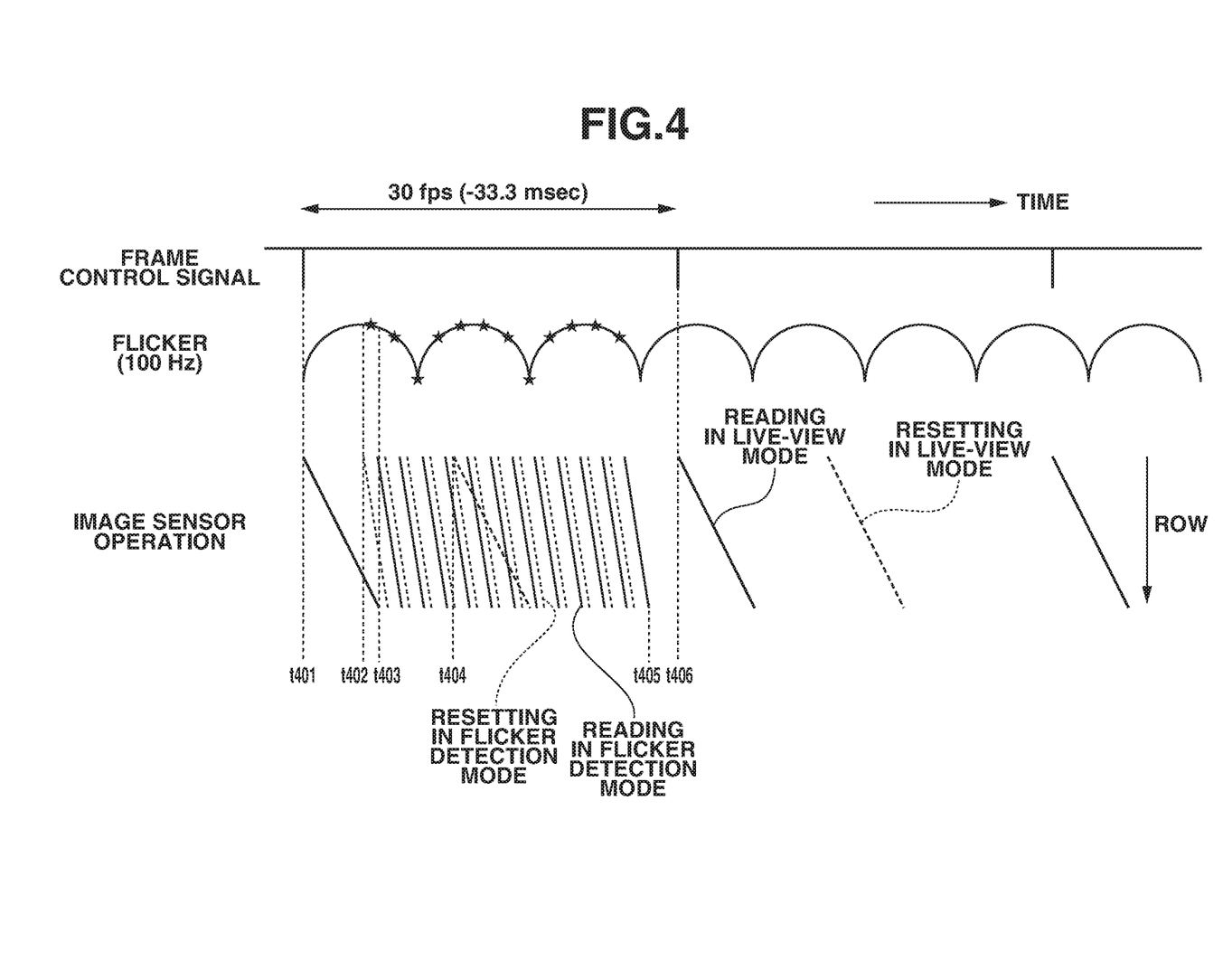
FIG. 4 is a timing chart illustrating a case of performing the flicker detection mode during the live-view mode according to an exemplary embodiment of the present invention.

Next, an example of an operation of setting the live-view mode and the flicker detection mode simultaneously will be described below with reference to FIG. 4. FIG. 4 illustrates an example of reading a live-view image of one frame at 30 fps from the image sensor 105. The image sensor 105 according to the present exemplary embodiment is capable of reading all the pixel rows of one frame in about 15 msec. Thus, in the operation in the live-view mode in which only one third of the pixel rows are to be read, the image sensor 105 can acquire the live-view image of one frame in about 5 msec, and the rest of the time period (vertical blanking time period) can be allocated to the operation in the flicker detection mode. FIG. 4 illustrates an example of reading 12 images for flicker detection during the vertical blanking time period while reading one live-view image during a one-frame control signal period (hereinafter, also referred to as a vertical drive (VD) period) corresponding to the frame rate. The operation sequence illustrated in FIG. 4 makes it possible to perform the operation in the flicker detection mode without stopping the operation in the live-view mode by the image sensor 105.

Specifically in FIG. 4, a frame control signal (hereinafter, also referred to as a VD) is a signal transmitted from the timing generation unit 107 and input to the image sensor 105, and the signal specifies timing to start a frame. In FIG. 4, an example of reading a live-view image at a frame rate of 30 fps is illustrated. A flickering frequency of a flicker light source is set to 100 Hz. An operation of a slit rolling method is illustrated as the operation in each of the driving modes of the image sensor 105 in FIG. 4. A reading operation from the unit pixels 202 is indicated by a solid line, whereas a reset operation is indicated by a broken line. Since the slit rolling operation sequentially performs control pixel-row by pixel-row, each line is inclined. In FIG. 4, the operation in the live-view mode is indicated by a thick line, whereas the operation in the flicker detection mode is indicated by a thin line.

In FIG. 4, at a time t401, the VD is input to the image sensor 105, and the reading operation in the live-view mode is started in synchronization with the VD. Then, at a time t403, the reading operation of the first frame is started in the flicker detection mode. In the present exemplary embodiment, the time t403 is set to substantially the same timing as the timing at which the reading operation of the last pixel row in the live-view mode is ended. The reading operation in the flicker detection mode is started in synchronization with the timing at which the reading operation in the live-view mode is ended, whereby the number of times of reading in the flicker detection mode per period is increased. Furthermore, the length of time during which the image sensor 105 operates is reduced so that power is saved. Further, in a case where an improvement in the reading speed in the flicker detection mode is desired, an operation may be performed to read pixel rows only from a range smaller than a reading range in the live-view mode.

The reading operation in the flicker detection mode is repeated until a time t405. In the present exemplary embodiment, the reading operation of reading 12 frames in the flicker detection mode is performed. A charge accumulation time period (hereinafter, referred to as the accumulation time period) in each of the modes is determined based on a predetermined exposure calculation result. For example, the accumulation time period is determined using the most recent frame or several recent frames including the most recent frame in such a manner that a subject is appropriately exposed. Images acquired by the operation in the flicker detection mode are used to detect flicker and are not displayed on the display unit 112. Thus, a shorter accumulation time period than the accumulation time period set to the operation in the live-view mode is settable.

At the time t403, the reading operation of the last pixel row in the live-view mode and a start of the reading operation in the flicker detection mode are synchronized. Thus, the reset operation corresponding to the reading operation in the flicker detection mode is performed at a time t402, which precedes the timing of the reading operation of the last pixel row in the live-view mode.

The reset operation does not require the use of the column circuit 205, so that the reading operation in the live-view mode and the reset operation in the flicker detection mode can be set to temporally overlap. Similarly, at a time t404, while the reading operation in the flicker detection mode is performed, the reset operation corresponding to the reading operation in the live-view mode at a time t406 is performed.

In the above-described example, control is performed to drive the flicker detection mode a plurality of times while the operation in the live-view mode is performed in the frame starting at the time t401. However, it is unnecessary to constantly perform the flicker detection mode as a situation in which the type of the light source (whether the light source is a flicker light source) with respect to the subject is changed in several tens of milliseconds is not likely to occur. The flicker detection mode may be performed at predetermined intervals, such as every one second or every several seconds. Alternatively, the release switch may have a two-level configuration so that the flicker detection mode is performed while the release switch is lightly pressed to a first level whereas still image capturing is performed if the release switch is deeply pressed to a second level. During the time period in which the operation in the flicker detection mode is not performed, it is desirable to control the column circuit 205 and the constant current source 203 so as to save power.

Figure 5:
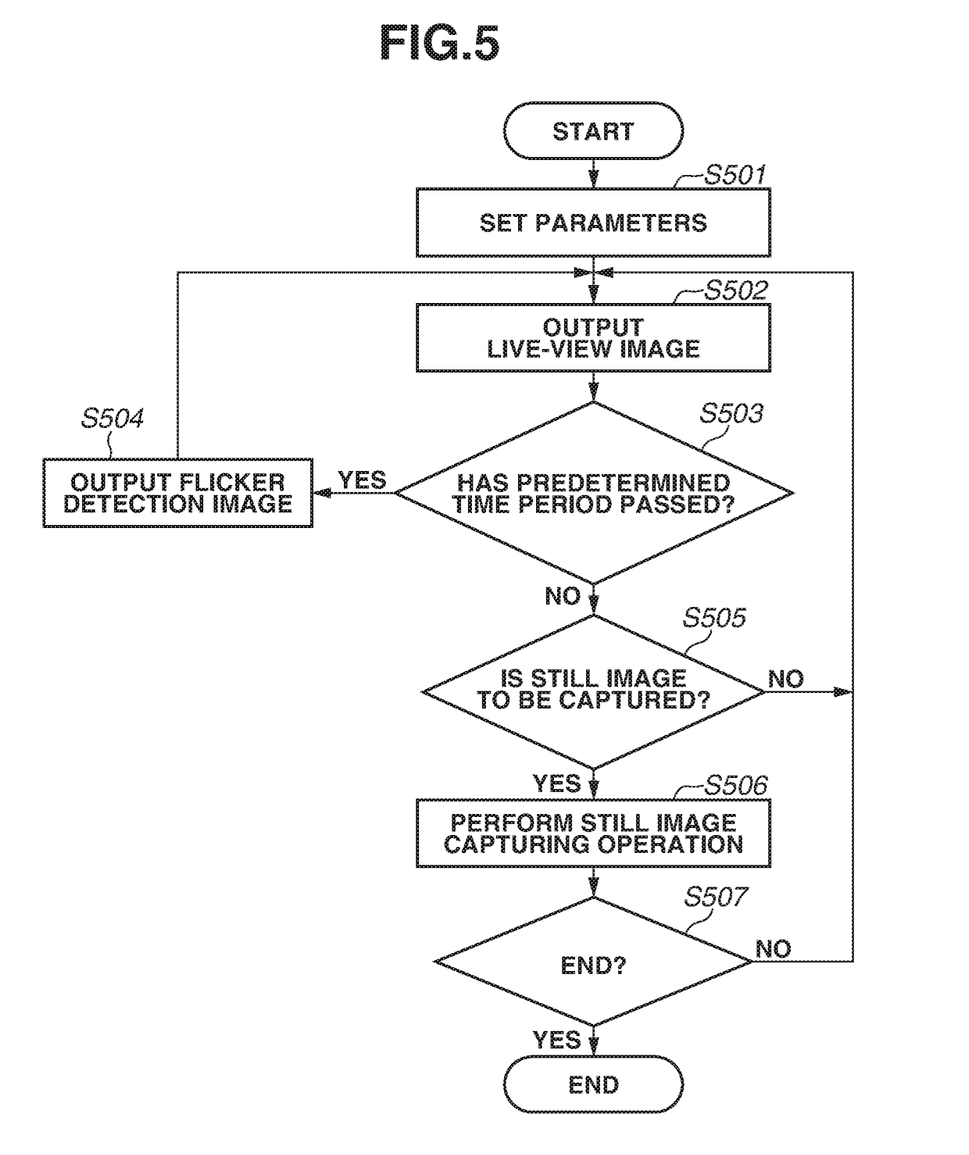
FIG. 5 is a flowchart illustrating a process according to an exemplary embodiment of the present invention.

A process of the image capturing operation performed by the image capturing apparatus 100 according to the present exemplary embodiment will be described below with reference to a flowchart illustrated in FIG. 5. The control unit 109 performs each step.

First, in step S501, after the image capturing operation is started, the control unit 109 sets various parameters to the image sensor 105 and the image processing unit 106 via the timing generation unit 107 and starts supplying the VD. The VD period of the VD supplied to the image sensor 105 corresponds to a frame rate at which the image sensor 105 operates, and the VD period is 1/30 sec in the present exemplary embodiment. Then, the processing proceeds to step S502. The various parameters include at least a setting parameter of the driving mode for the image sensor 105 to operate and an exposure parameter such as an accumulation time period and a gain setting.

In step S502, the control unit 109 performs control to start the operation in the live-view mode in the image sensor 105 and causes the image sensor 105 to output image data. The output of image data in the live-view mode is repeatedly executed in synchronization with the VD supply timing. Then, the processing proceeds to step S503.

In step S503, the control unit 109 measures an elapsed time based on a result of time measurement by a time measurement unit (not illustrated). Then, the control unit 109 determines whether a predetermined time period has passed. If the control unit 109 determines that the predetermined time period has passed (YES in step S503), the processing proceeds to step S504. If the control unit 109 determines that the predetermined time period has not passed (NO in step S503), the processing proceeds to step S505. A timing at which the time measurement unit starts measurement, or a reference for the time measurement, is the previous flicker detection. More specifically, the control unit 109 determines whether the predetermined time period has passed since the previous detection. At a time point immediately after the flowchart is started, a probability that no flicker detection has been performed before the time point is high, whereby the processing may proceed to step S504 regardless of whether the predetermined time period has passed. While the determination is made based on the elapsed time in the present exemplary embodiment, the determination is not limited to that described above. For example, the determination may be made based on the number of output live-view images or the number of VDs.

In step S504, the control unit 109 performs control to start the operation in the flicker detection mode in the image sensor 105 and causes the image sensor 105 to output image data for flicker detection. As illustrated in FIG. 4, a plurality of pieces of image data for the flicker detection mode is output with respect to one VD. Then, the processing returns to step S502. To start the operation in the flicker detection mode, parameters for setting the driving mode need to be made to the image sensor 105, but it is inconvenient to make the setting at every several seconds. Thus, it is desirable to provide the image sensor 105 with a plurality of resistors for storing the parameters for setting the driving mode and complete the setting to the resistors in step S501. Further, a flag that indicates which parameter for setting the driving mode is to be used may be provided to the resistors so that the operation of the image sensor 105 can be switched with ease.

In step S505, the control unit 109 determines whether a still image capturing instruction is input based on a user operation on the release switch. If the control unit 109 determines that a still image capturing instruction is input (YES in step S505), the processing proceeds to step S506. If the control unit 109 determines that no still image capturing instruction is input (NO in step S505), the processing returns to step S502.

In step S506, the control unit 109 performs control to start the operation in the still image mode in the image sensor 105 and causes the image sensor 105 to output image data. Output of the image data for a still image is executed only once in synchronization with the VD supply timing. Then, the processing proceeds to step S507, and the process illustrated in the flowchart is repeated until an end instruction is received.

The flicker detection mode is performed in parallel with the operation in the live-view mode during the vertical blanking time period as described above to make it possible to execute flicker detection without stopping the live-view display.

Since the dark current is proportional to the accumulation time period, the signal processing circuit 207 may be configured not to perform correction processing such as clamp processing in the flicker detection mode in which the reset operation and the reading operation are performed at high speed. In the present exemplary embodiment, the example in which no VD is needed in the flicker detection mode is described, and in this example, control for automatically switching the driving mode set to the resistors of the image sensor 105 is necessary. If the control load of the control is to be reduced, the VD for performing the flicker detection mode may be input separately.

While the configuration illustrated in FIG. 2 includes one vertical signal line and the column circuit 205 for each pixel column, a plurality of vertical signal lines and the corresponding column circuits 205 may be provided. This configuration allows an operation time period in the live-view mode and an operation time period in the flicker detection mode to overlap so that faster reading can be achieved.

(Operation of Image Processing Unit)

Details of the processing to be performed by the image processing unit 106 on the image data output from the image sensor 105 will be described below.

Figure 6:
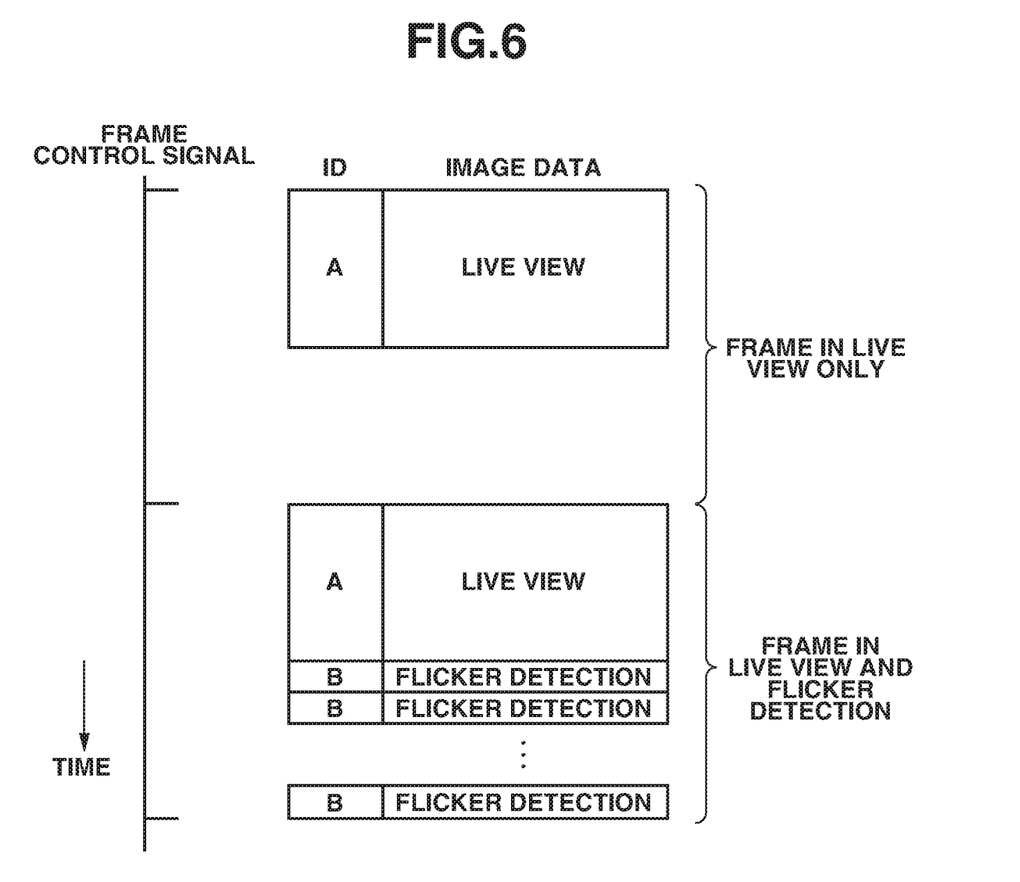
FIG. 6 is a diagram illustrating a format of data output from the image sensor according to an exemplary embodiment of the present invention.

An operation of the signal processing circuit 207 provided to the image sensor 105 according to the present exemplary embodiment will be described below with reference to FIG. 6. The signal processing circuit 207 includes a function of assigning an identifier (ID) to a digital signal input from the column circuit 205 in addition to the above-described clamp processing. FIG. 6 illustrates an image of image data output from the image sensor 105 with respect to the VD. The output signal that is the image data output from the image sensor 105 includes the ID and the image data. The ID included in the output signal is also used by the image processing unit 106, which is a subsequent unit. Since the image processing unit 106 performs processing row by row, it is desirable to assign the ID to each row, which is a unit of processing. A plurality of bits is allocated to the ID.

In the present exemplary embodiment, the ID is used in determining the operational mode in which the image processing unit 106 acquires the image data. More specifically, the ID is data that differs for each mode corresponding to the acquired image data. In the present exemplary embodiment, "A" refers to the ID assigned in the case where image data is acquired in the operation in the live-view mode, whereas "B" refers to the ID assigned in the case where image data is acquired in the operation in the flicker detection mode.

In a case of a frame in which only the operation in the live-view mode is performed in one VD period, image data with the ID "A" is sequentially output to the image processing unit 106. In a case of a frame in which both the operation in the live-view mode and the operation in the flicker detection mode are performed in one VD period as illustrated in FIG. 4, image data with the ID "B" is output after the image data with the ID "A". While the operation in the flicker detection mode is performed after the operation in the live-view mode is ended in the unit pixel reading in FIG. 4, the reading is not limited to the above-described reading, and there may be a case where the operation time period in the live-view mode and the operation time period in the flicker detection mode overlap. In this case, a pixel row or region contains both image data with the ID "A" and image data with the ID "B".

Figure 7:
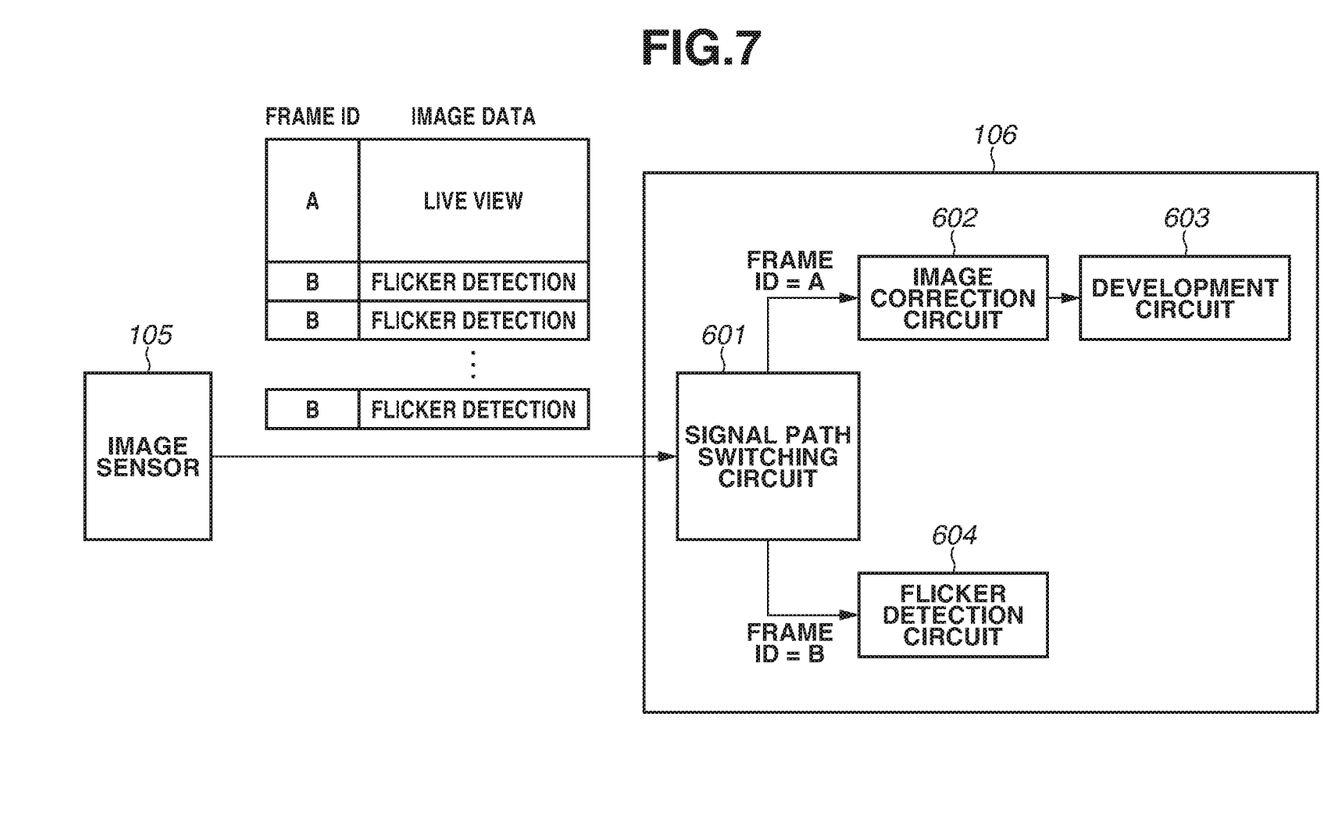
FIG. 7 is a diagram illustrating signal paths in an image processing unit according to an exemplary embodiment of the present invention.

Next, the signal processing performed by the image processing unit 106 will be described below with reference to FIG. 7. FIG. 7 illustrates signal paths of the image processing unit 106. The image processing unit 106 includes, on an input path from the image sensor 105, a signal path switching circuit 601, an image correction circuit 602, a development circuit 603, and a flicker detection circuit 604. The signal path switching circuit 601 identifies the ID of input image data. Then, the signal path switching circuit 601 outputs the image data to one of a signal path (hereinafter, "image signal path") constituted of the image correction circuit 602 and the development circuit 603 and a signal path (hereinafter, "flicker detection signal path") constituted of the flicker detection circuit 604 in a subsequent stage. In the present exemplary embodiment, image data with the ID "A" is output to the image signal path, whereas image data with the ID "B" is output to the flicker detection signal path.

The image signal path is a path for generating an image to be displayed on the display unit 112 or an image to be recorded in the recording medium 111, and mainly the image correction circuit 602 performs various processing such as offset correction, gain correction, and color adjustment, followed by development processing by the development circuit 603. The image data having undergone the development processing is temporarily stored in the memory unit 108 and thereafter is displayed or recorded.

On the other hand, the flicker detection signal path is a path on which the flicker detection circuit 604, which is a detection unit, detects whether there is a flicker based on luminance information about the image data and calculates a period and phase of the flicker. The detection or calculation result is output to the control unit 109. Then, the control unit 109 controls a display of information about presence/absence of a flicker on the display unit 112 and an image capturing control timing of the timing generation unit 107.

While the example in which the operation in the live-view mode and the operation in the flicker detection mode are performed in parallel in one VD period is illustrated in FIG. 4, the configuration is not limited to the above-described example, and the operation in the flicker detection mode may also be performed over a plurality of VD periods. For example, in a case of performing the operation in the live-view mode at 120 fps, sometimes sufficient pieces of image data for flicker detection cannot be acquired within one VD period. In this case, it is desirable to make a setting to perform the operation in the flicker detection mode over a plurality of VD periods. In the case where the operation in the flicker detection mode is performed over the plurality of VD periods, the amount of image data acquired by the operation in the flicker detection mode and output in addition to image data acquired by the operation in the live-view mode may differ for each frame. Even if the data amount becomes unequal between frames, since the ID is provided to the image data, the image data is guided as appropriate in the image processing unit 106 without any special control.

As described above, the ID corresponding to the purpose of use is provided to the image data output from the image sensor 105 so that pieces of image data that are consecutively input within a very short period of time are efficiently guided to an appropriate signal path without sequentially making settings.

In the first exemplary embodiment, the example in which the operation in the flicker detection mode is performed during the vertical blanking time period in the operation in the live-view mode has been described. In a second exemplary embodiment, an operation in the flicker detection mode in a case where the release switch is pressed and a still image capturing instruction is input while only the live-view mode is operated will be described below.

In order to reduce an effect of the flicker light source, the image capturing apparatus 100 according to the present exemplary embodiment controls an accumulation start timing in such a manner that a center of an accumulation time period during the image capturing in the still image mode substantially matches a maximal value of a change in the light amount by the light source. In the timing control, the phase of a flicker and the change in the light amount need to be detected accurately, so that it is desirable to perform the operation in the flicker detection mode immediately before the image capturing operation in the still image mode. However, in a case of performing the still image capturing operation after the operation sequence in FIG. 4 is executed, a release time lag between the input of a release signal and a start of accumulation may become long. In the present exemplary embodiment, a desirable sequence for a case where the release switch is pressed during the operation in the live-view mode and the operation in the flicker detection mode is performed will be described.

Figure 8A:
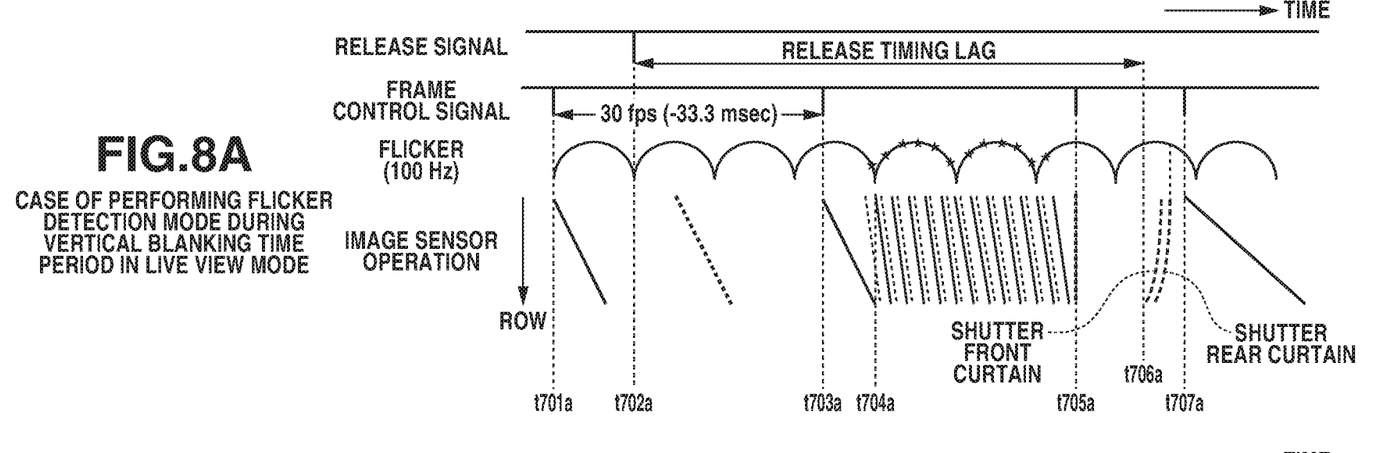
FIGS. 8A and 8B are timing charts each illustrating a case of performing the flicker detection mode before capturing a still image according to an exemplary embodiment of the present invention.
Figure 8B:
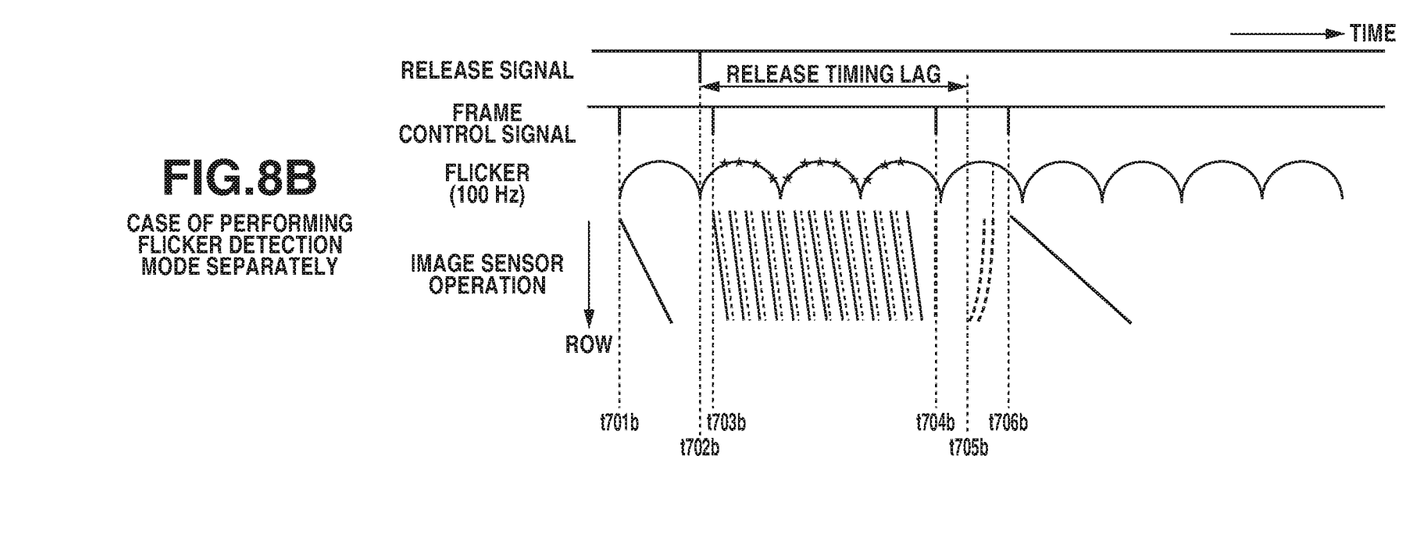

FIG. 8A illustrates an example of a case where the release switch is pressed during the operation in the live-view mode and the operation in the flicker detection mode is performed during the vertical blanking time period in the operation in the live-view mode, which has been described above in the first exemplary embodiment. On the other hand, FIG. 8B illustrates an example of a case where the operation in the flicker detection mode is independently performed in synchronization with the VD (independent of the operation in the live-view mode). While the example of control in which the accumulation time period in the still image capturing operation is controlled using the shutter 103 is described in the present exemplary embodiment, the control is not limited to the above-described example, and the accumulation time period may be controlled using an electrical shutter operation either alone or in combination with a mechanical shutter operation.

First, FIG. 8A will be described below. At a time t701a, the VD is input, and reading in the live-view mode is started. Next, at a time t702a, if the release switch is pressed, the timing generation unit 107 controls the image sensor 105 in such a manner that the operation in the flicker detection mode is performed during the vertical blanking time period in the operation in the live-view mode in the next frame.

Then, at a time t703a, which is 33.3 msec (=30 fps) after the time t701a, if the VD is input again, reading in the live-view mode is performed again. Then, from a time t704a, reading in the flicker detection mode is performed sequentially. Then, the flicker detection circuit 604 calculates the period and phase of the flicker based on image data for flicker detection that is repeatedly read during a predetermined time period. With respect to the still image capturing operation, the reset operation is executed on each pixel unit based on the VD input at a time t705a after the operation in the flicker detection mode is ended. Then, at a time t706a, the shutter 103 is controlled based on the detected period and phase of the flicker in such a manner that the center of the accumulation time period substantially matches the maximal value of the change in the light amount by the light source. Thereafter, at a time t707a, reading in the still image capturing operation is performed. In the operations illustrated in FIG. 8A, there is a waiting time between the press of the release switch and the input of the VD for use in the operation in the live-view mode. This is because the operation in the flicker detection mode is performed during the vertical blanking time period in the operation in the live-view mode. This is not desirable for a moving subject, although execution of the operation in the flicker detection mode immediately before the still image capturing operation is achieved.

Next, FIG. 8B will be described below. At the time t701b, the VD is input, and live-view reading is started. Next, at a time t702b, if the release switch is pressed, the timing generation unit 107 controls the image sensor 105 in such a manner that the operation in the flicker detection mode is performed in synchronization with the VD in the next frame.

Then, at a time t703b, if the VD is input, the operation in the flicker detection mode is performed. Then, the flicker detection circuit 604 calculates the period and phase of the flicker based on image data for flicker detection that is repeatedly read during a predetermined time period. With respect to the still image capturing operation, the reset operation is executed on each pixel unit based on the VD input at a time t704b after the operation in the flicker detection mode is ended. Then, at a time t705b, the shutter 103 is controlled based on the detected period and phase of the flicker in such a manner that the center of the accumulation time period substantially matches the maximal value of the change in the light amount by the light source. Thereafter, at a time t706b, reading in the still image capturing operation is performed.

The input of the VD at the time t703b is performed not in synchronization with the VD at the time t701b but based on the release signal input at the time t702b. Further, the input of the VD at the time t704b is performed after a time period that is necessary for the operation in the flicker detection mode passes. For example, the VD is input after a time period that is necessary for acquiring 12 pieces of image data in the flicker detection mode passes. As apparent from FIG.

4 or 8A, the time period that is necessary for the operation in the flicker detection mode is shorter than the VD period (33.3 msec) in the operation in the live-view mode, and the release time lag is shorter than that in FIG. 8A. Thus, not only execution of the operation in the flicker detection mode immediately before the still image capturing operation is achieved but also the short release time lag is achieved, so that a risk of missing a good opportunity for capturing an image of a moving subject is reduced.

In the first and second exemplary embodiments, how the operation in the dedicated flicker detection mode is to be combined with an operation in another driving mode in order to detect the presence/absence of a flicker light source and the period and phase of a flicker has been described. However, a light source for the subject can include a light source other than the flicker light source, and characteristics of the other light sources may vary.

In a third exemplary embodiment, a light source detection mode for detecting a characteristic of a light source for a subject, that is not limited to a flicker light source, will be described below as another form of the flicker detection mode. In particular, there is described an example in which an increased dynamic range of luminance information is achieved in a case of performing auto exposure (AE) processing using luminance information about image data from the image sensor 105.

In detecting a characteristic of a light source for a subject, it is very important to detect how bright the light source is. For example, the brightness of a light source varies significantly depending on whether the light source is a sunlight source or a fluorescent light source, and an image capturing condition for detecting a characteristic of the light source differs significantly. In normal AE processing, a user can set an appropriate exposure without performing special control. However, in a case where the expected brightness of a light source is significantly different from the actual brightness of the light source, there is a possibility that a dynamic range determined based on the characteristics of the image sensor 105 is exceeded and accurate AE processing cannot be performed, and a good opportunity for capturing an image can be missed. Thus, in order to increase the speed of the AE processing for detecting a characteristic of the light source, it is desirable that the dynamic range of image data from the image sensor 105 is increased.

Figure 9:
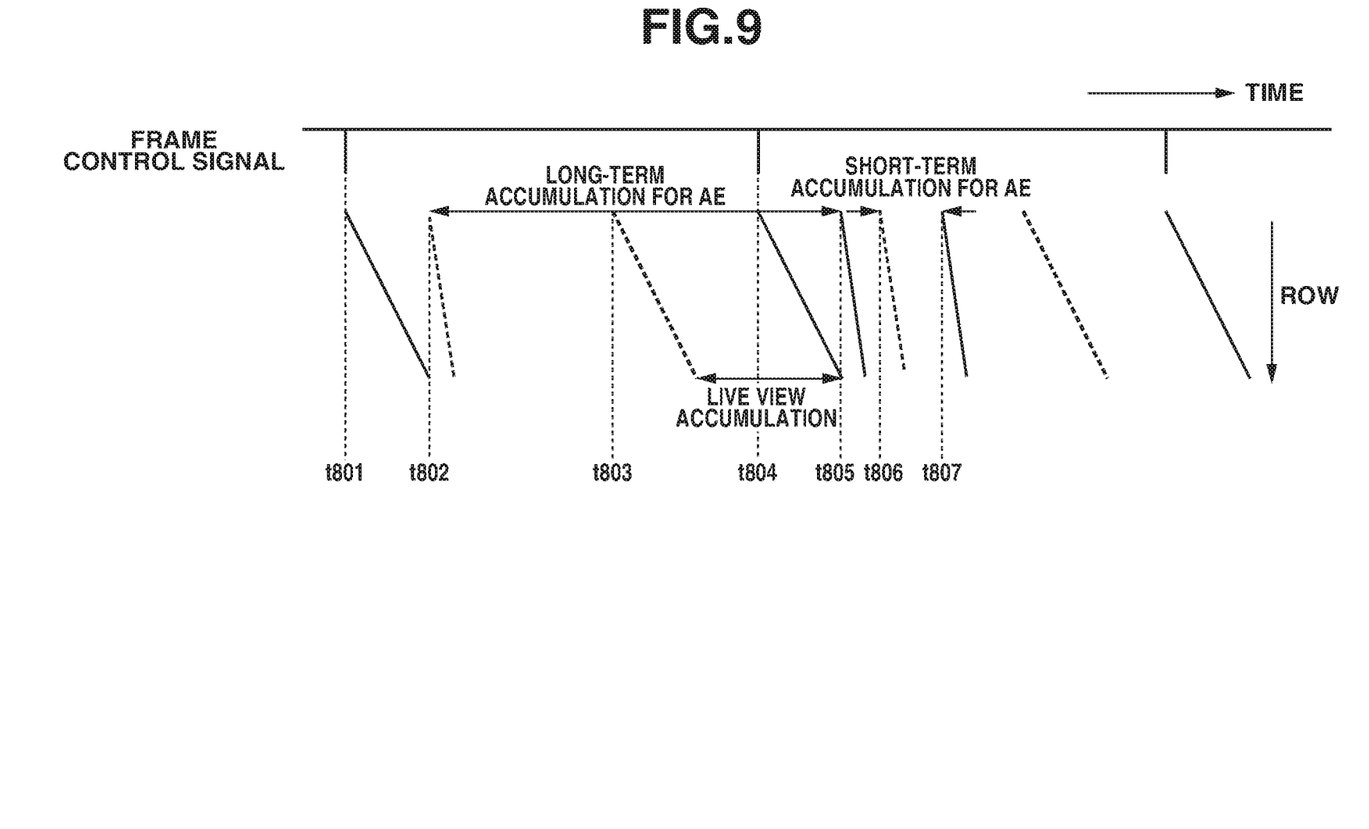
FIG. 9 is a timing chart illustrating a case of performing auto exposure (AE) detection according to an exemplary embodiment of the present invention.

Details of a driving mode of the image sensor 105 for increasing the dynamic range according to the present exemplary embodiment will be described below with reference to FIG. 9. FIG. 9 illustrates a reading operation timing in a case of acquiring luminance information with a wide dynamic range while the operation in the live-view mode is performed.

A reading operation for acquiring luminance information (hereinafter, also referred to as AE information) for performing AE processing as a driving mode corresponding to the flicker detection mode in the present exemplary embodiment will be referred to as AE detection mode. In the present exemplary embodiment, the rows to be read in the operation in the live-view mode are the same as the rows to be read in the operation in the live-view mode in FIG. 3, and the rows to be read in an operation in the AE detection mode are the same as the rows to be read in the operation in the flicker detection mode in FIG. 3. Reading at a high-speed frame rate is less necessary in the operation in the AE detection mode than in the operation in the flicker detection mode, and other rows can be used if the rows that are not to be read in the operation in the live-view mode are used.

FIG. 9 illustrates an example of reading a live-view image of one frame at 30 fps from the image sensor 105. The image sensor 105 according to the present exemplary embodiment is capable of reading all the pixel rows of one frame in about 15 msec. Thus, in the case of the operation in the live-view mode in which only one third of the pixel rows are to be read, the live-view image of one frame is acquired in about 5 msec, and the remaining time period (vertical blanking time period) can be allocated to the operation in the AE detection mode. In FIG. 9, an example is illustrated in which, while two live-view images are read during two VD periods corresponding to the frame rate, two images for AE detection are read during the vertical blanking time period. The operation sequence illustrated in FIG. 9 makes it possible to perform the operation in the AE detection mode without stopping the operation in the live-view mode in the image sensor 105.

More specifically, in FIG. 9, the VD is a signal that is input from the timing generation unit 107 to the image sensor 105 and indicates a frame start timing. In the present exemplary embodiment, an example of reading a live-view image at a frame rate of 30 fps will be described. An operation of a slit rolling method is illustrated as an operation in each of the driving modes of the image sensor 105 in FIG. 9, and a reading operation from the unit pixels 202 is indicated by a solid line, whereas a reset operation is indicated by a broken line. The slit rolling operation sequentially performs control pixel-row by pixel-row, so that each line is inclined. In FIG. 9, the operation in the live-view mode is indicated by a thick line, whereas the operation in the AE detection mode is indicated by a thin line.

In FIG. 9, at a time t801, the VD is input to the image sensor 105, and the reading operation in the live-view mode is started in synchronization with the VD. Then, at a time t804, the reading operation in the live-view mode after the accumulation for a predetermined time period is performed again. Thereafter, at a time t805, first reading that is the reading operation in the AE detection mode after the accumulation for the predetermined accumulation time period is performed. At a time t807, second reading that is the reading operation in the AE detection mode after the accumulation for a shorter accumulation time period than the accumulation time period corresponding to the first reading is performed.

Since the reading operation in the live-view mode and the reset operation in the flicker detection mode can temporally overlap, the timing of the reset operation can be set more freely than the timing of the reading operation. In the present exemplary embodiment, at a time t802, a first reset operation in the AE detection mode is performed. Next, at a time t803, the reset operation in the live-view mode is performed, and at a time t806, a second reset operation in the AE detection mode is performed.

While the reading operation in the AE detection mode is performed twice in two VD periods in the present exemplary embodiment, the number of times of the reading operation is not limited to two and can be three or more. In this case, three or more accumulation time periods can be set. Further, reading in the AE detection mode can be executed once in one VD period. The accumulation time period corresponding to the first reading in the AE detection mode can be set to a longer time period than one VD period by controlling the first reading and the second reading as illustrated in FIG. 9. This makes it possible to increase the dynamic range while maintaining a smooth live-view display on the display unit 112.

While the long-term accumulation time period is set and thereafter the short-term accumulation time period is set in the AE detection mode in FIG. 9, the time periods can be set in the opposite order. Further, while the example in which the plurality of reading operations is performed in the AE detection mode has been described, the AE detection mode can also be achieved by performing one reading operation by providing an addition unit configured to add reading operation results together in the image sensor 105.

Since the reading operation in the AE detection mode and the reading operation in the live-view mode cannot be performed simultaneously, the timing at which the reading in the live-view mode is ended and the timing at which the reading in the AE detection mode is started are set to be at substantially the same timing at the time t805, but the timings are not limited to those described above. For example, the reading operation in the AE detection mode and the reading operation in the live-view mode may be executed at timings that are sufficiently separated, or in the case of the configuration including the plurality of vertical signal lines and the corresponding column circuits 205, the operation time period in the live-view mode and the operation time period in the flicker detection mode may be controlled to overlap.

In the present exemplary embodiment, the example in which the reading operations corresponding to the plurality of accumulation time periods are performed to detect the characteristic of the light source for the subject has been described. Such a reading operation is desirably performed in a case where an appropriate exposure is unknown, e.g., immediately after image capturing is started or immediately after the subject is changed, or immediately before the still image capturing operation in which highly accurate AE detection is necessary. Further, it is also possible to combine such a reading operation with the flicker detection mode described in the first and second exemplary embodiments, and a longer accumulation time period than the other accumulation time periods can be set by controlling one of the reset timings corresponding to the plurality of reading operations. Further, characteristics of the light source that can be detected by applying the present exemplary embodiment and can be set as a detection target include a change in luminance or color of the light source, the incident angle of the light source, the polarization state of the light source, and the waveform components of the light source.

The image capturing apparatus 100 described in each of the exemplary embodiments is applicable to various applications. For example, the image capturing apparatus 100 can be used in sensing light such as infrared light, ultraviolet light, and X-rays in addition to visible light. The image capturing apparatus 100 is typically a digital camera but is also applicable to a camera-attached mobile phone such as a smartphone, a monitoring camera, and a game machine. The image capturing apparatus 100 is also applicable to an endoscope, a medical apparatus for capturing a blood vessel image, a beauty care device for observing skin or scalp, and a video camera for capturing sports or action moving images. The image capturing apparatus 100 is also applicable to a traffic-purpose camera such as a camera for monitoring traffic or ships or a dashboard camera, a camera for academic use such as astronomical or specimen observation, a camera-attached home electric appliance, and machine vision. In particular, the machine vision is not limited to industrial robots and is also applicable in the fields of agriculture and fishery.

The configuration of the image capturing apparatus 100 described in the exemplary embodiments is a mere example, and an image capturing apparatus to which the present invention is applicable is not limited to the configuration illustrated in FIG. 1. Further, the circuit configurations of the components of the image capturing apparatus are not limited to those illustrated in the drawings.

The present invention can also be realized by a process in which a program for implementing one or more functions of the above-described exemplary embodiments is supplied to a system or an apparatus via a network or a storage medium and one or more processors of a computer of the system or the apparatus read and execute the program. Further, the present invention can also be realized by a circuit (e.g., application-specific integrated circuit (ASIC)) that implements one or more functions.

The above-described exemplary embodiments describes a mere example of specific implementation of the present invention, and the technical scope of the present invention should not be interpreted in a limited way by the description. In other words, the present invention can be implemented in various forms without departing from the technical concept or the major feature of the present invention. The present invention provides an image capturing apparatus capable of performing flicker detection for detecting a characteristic of a light source without stopping a live-view display.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-213730, filed Nov. 14, 2018, which is hereby incorporated by reference herein in its entirety.

What is claimed is:

1. An apparatus comprising:
an image sensor including:
  a pixel unit in which a plurality of unit pixels each including a photoelectric conversion element is arranged in a column direction and a row direction;
  at least one memory configured to store instructions; and
  at least one processor in communication with the at least one memory and configured to execute the instructions to:
    assign a first identifier (ID) to first image data which is based on signals read out from a plurality of first pixel rows of the pixel unit and a second ID to second image data which is based on signals read out from a plurality of second pixel rows different from the plurality of first pixel rows of the pixel unit;
an image processor including:
an image correction circuit configured to perform predetermined correction processing on image data outputted from the pixel unit;
a development circuit configured to develop the image data on which the predetermined correction processing has been performed by the image correction circuit;
a flicker detection circuit configured to detect whether a flicker is present or absent; and
a signal path switching circuit configured to receive an input of the image data, perform ID identification on the inputted image data, output to the image correction circuit the first image data to which the first ID is assigned, and output to the flicker detection circuit the second image data to which the second ID is assigned.

2. The apparatus according to claim 1,
further comprising a display unit configured to display an image based on the first image data.

3. The apparatus according to claim 2,
wherein the second image data is not displayed on the display unit.

4. The apparatus according to claim 1,
wherein the reading of the signals from the plurality of second pixel rows of the pixel unit is performed after the reading of the signals from the plurality of first pixel rows of the pixel unit.

5. The apparatus according to claim 4, wherein an accumulation time period in the plurality of first pixel rows and an accumulation time period in the plurality of second pixel rows overlap at least partially.

6. The apparatus according to claim 1, wherein an exposure condition in the plurality of first pixel rows and an exposure condition in the plurality of second pixel rows are able to be controlled separately.

* * * * *